United States Patent

Sporer et al.

(10) Patent No.: US 8,346,773 B2
(45) Date of Patent: Jan. 1, 2013

(54) PRODUCT CLASSIFICATION SYSTEM

(75) Inventors: Hans Sporer, Fürstenfeldbruck (DE);
Katharina Schulte, München (DE)

(73) Assignee: ecs Beratung & Service GmbH,
Munich (DE)

( * ) Notice: Subject to any disclaimer, the term of this patent is extended or adjusted under 35 U.S.C. 154(b) by 114 days.

(21) Appl. No.: 12/908,532

(22) Filed: Oct. 20, 2010

(65) Prior Publication Data

US 2011/0093465 A1   Apr. 21, 2011

(30) Foreign Application Priority Data

Oct. 21, 2009   (EP) .................................... 09013309

(51) Int. Cl.
*G06F 17/30* (2006.01)
(52) U.S. Cl. ........................................................ 707/737
(58) Field of Classification Search .................. 707/2, 3, 707/104.1, 737; 709/223
See application file for complete search history.

(56) References Cited

U.S. PATENT DOCUMENTS

| | | | |
|---|---|---|---|
| 6,421,668 B1 * | 7/2002 | Yakhini et al. ........................ 1/1 |
| 2002/0069258 A1 * | 6/2002 | Howard et al. ............... 709/217 |
| 2002/0083096 A1 * | 6/2002 | Hsu et al. ...................... 707/513 |
| 2003/0236768 A1 * | 12/2003 | Sribhibhadh et al. ............. 707/1 |
| 2004/0039759 A1 * | 2/2004 | Detlefs et al. ................. 707/206 |
| 2007/0250549 A1 * | 10/2007 | Meyer et al. .................. 707/203 |
| 2007/0299855 A1 | 12/2007 | Levin |

FOREIGN PATENT DOCUMENTS

| DE | 102 43 281 A1 | 7/2003 |
|---|---|---|
| DE | 10 2005 008 844 A1 | 9/2006 |

OTHER PUBLICATIONS

English translation of European Search Report dated Feb. 2, 2010.
European Search Report dated Feb. 2, 2010.

* cited by examiner

*Primary Examiner* — Etienne LeRoux
(74) *Attorney, Agent, or Firm* — Lempia Summerfield Katz LLC (57) ABSTRACT

Data is analyzed by a computer for the automated creation of a new data structure for information technology objects. The objects represent technical components from the mechanical engineering sector or the electrical industry and are assigned to a company. The objects to be structured are captured and then subjected to a parsing. Technical relationships are then created between the parsed objects to construct technical metrics. The data structure is derived from the technical metrics.

21 Claims, 2 Drawing Sheets

FIG.2

PRODUCT CLASSIFICATION SYSTEM

This application claims the benefit of EP 09 013 309.1, filed Oct. 21, 2009.

DESCRIPTION

The present embodiments relate to a method for the computer-assisted input and analysis of data for the automatic creation of a new data structure for information technology objects. The information technology objects represent technical components from the mechanical engineering and production sectors. The present embodiments also relate to an application of the method for controlling access to the objects and for correcting errors in an existing classification structure. In addition the present embodiments relates to a system and a computer program for the above-specified method.

BACKGROUND

Today, most processes and sequences in development and production and in other technical fields are computer-assisted in order to allow electronic processing of the underlying data. Depending on the use in the field of mechanical engineering, a large number of different computer-assisted products are known on the market, such as stock-keeping systems, product data management systems (hereinafter abbreviated to: PDM systems), purchasing systems, parts-lists management systems, CAD systems, drawing archives, work schedules, and production planning and control systems. The basis for these systems is a database in which the technical objects are stored.

In order for the technical systems to function efficiently and error-free, an error-free assignment of the actually existing technical products or objects to the information technology objects which are stored in a database is provided.

In particular, it is important to provide an error-corrected database. Errors can result when several information technology objects which refer to the same technical item are generated for one and the same item (e.g., a product). It is likewise possible that the technical items have been included in the electronic system under different names, which may lead to costly consequential errors.

STATE OF THE ART

In order to create as good as possible a basis for such electronic systems, it is known in the state of the art to improve the structure or ordering of data sets which are already classified in a predetermined or existing data structure.

Thus, DE 10 2005 008 844 shows a method and a device for the computer-assisted classification of data. The principle disclosed here is based on a stochastic approach and processes frequency distributions for the occurrence of the objects to be classified. A disadvantage of this method is that the data structure is predetermined at the start of the processing and thus can no longer be amended from the basic structure.

In addition data management systems for classifying data sets in existing classification structures are known in the state of the art. For example, US Published Application No. 20070299855 shows an approach to the structuring of unstructured data via the capturing of details relating to their data format.

SUMMARY AND DESCRIPTION

Information technology objects representing technical components or products from the field of mechanical engineering or the electronics industry may be completely automatically structured into a data structure to be newly created, wherein technical dependencies between the components are to be taken into account. A fully automated creation of a technical data structure in which errors due to misclassification are avoided may be possible. A simplified search for the technical components may be possible.

The present embodiments may include the applications of the method, by a system and by a computer program according to the attached claims.

The features, advantages, and advantageous embodiments of the present embodiments mentioned in connection with the method are likewise to be transferred to the other claimed categories (i.e. to the system and the computer program) and vice versa. The functional features of the method are achieved by corresponding hardware components of a microchip which have the functionalities described in connection with the method. In other words the present embodiments comprise multiple solutions: a software solution, a hardware solution, or a combination thereof.

The software solution includes one or more applications which are preferably implemented in a client-server architecture and run partly or wholly on a customer's computer in the company in question or on one or more computers (e.g. within the framework of a cloud computing architecture) of an application provider. The application or parts thereof can likewise be downloaded via an Internet interface by the application provider.

In the case of the hardware solution the method, in particular the classification and storage, is controlled by a microprocessor.

The concepts of this application are explained in more detail below.

Data "analysis" is data processing on a computer for the purpose of the automatic, such as fully automatic, creation of a new class or data structure. The analysis comprises the automatic or computer-assisted reading-in of the data via an interface, as well as the processing of the read-in data using predefined rules and parameters as well as criteria. The data are technical data, in particular from the field of mechanical engineering or electrical engineering. Other embodiments may instead provide for other technical applications.

"Create ... new" denotes, as a rule, that a new data structure is created. However, it is alternatively possible for already existing data structures to be modified in order to be adapted and designed for the current application. However, the relationships between the objects are constantly regenerated and thus the objects are also newly classified into the data structure (possibly also into an existing structure). The generation of the data structure comprises all forms of data structures, such as data structures whose entries are chained via references or data structures in the form of lists and tables with corresponding substructures. Tags or pointers may be provided in the data structure, in order that reference can be made to an entry in the data structure.

"Information technology objects" is, within the framework of these present embodiments, all objects which are structured or classified into the data structure to be created and represent technical components or items from the technical production sector. Usually the objects are assigned to an entity. The entity is usually an organizational unit, such as a company, a part of the company, combined corporate operations (e.g. a production unit), or a development department. The objects are stored in a database. The database can be structured according to different schemes. Thus, the structure of the database can be relational, object-orientated, network-like and/or hierarchical, or correspond to variant or hybrid forms.

The objects to be structured are usually "captured" fully automatically via an interface provided for the purpose. Usually, the objects are read in from other systems or memories via an interface. The objects can likewise be read in from other units via a provided data transfer connection. In special embodiments, a semi-automatic procedure may be provided, such that the captured objects have to be confirmed by a user interaction.

"Parsing" of the objects is analysis of the captured objects. Depending on the embodiment, the parsing procedure comprises a semantic or syntactic parsing. For this, the captured objects are analysed having regard to predefinable rules, in order to extract the data relevant for the technical metrics. In the preferred embodiment, the parsing process also comprises the creation of a log file in order to store the extracted information and the result of the parsing and also make them available for later analyses. The parser or parsing can be controlled by various techniques, say as top-down parser, bottom-up parser. In addition, it can be operated with different implementation techniques (e.g. recursive descent or recursive ascent etc).

The "technical relationships" are semantic relationships between the objects, wherein the relationships represent technical dependencies between the items or technical components. The technical relationships are defined in order to measure there from a technical distance between the objects and in order to create technical metrics. The feature "creation of technical relationships" can therefore also comprise "measurement of a gap or a distance between the objects." The term "technical metrics" can also be described as a network, in particular a semantic network, in order to represent crosslinkings or relationships between the technical items. Entity-specific distances and adjacency matrices are calculated at the moment the network is constructed. This takes place, according to an advantageous embodiment, on the basis of an entity-specific parameterization.

The feature "construction/modification of technical metrics" includes the creation of a semantic network with well-defined distance relationships between the objects which are based on the technical conditions of the production operation. To create the technical metrics, a degree of semantic similarity for every object to every other object is measured in the data volume, with the result that an adjacency matrix for the data volume is obtained. The measurement is based on the sum of the relationships existing between the signifiers of the objects. The result of the calculation can be parametrized in various ways. Three methods may be described in more detail below:

1. Single or multiple relationships can be left out of consideration. For example, for a purely taxonomic consideration only the relationship [A is a special case of B] can be used.

The calculation can be limited to the descriptions of the objects or include further features (material, standards, or embodiments) and so define the degree of detailing of the consideration of the quantity of objects (indirect relationships).

For example: head cap screws covered by the joint standard ISO4762 (hexagon socket head cap screws) have a higher semantic proximity to each other than a ISO4762 head cap screw and a different one conforming to DIN7984 (low head hexagon socket cap screw)

2. Individual relationships can be weighted more strongly than other relationships. Thus, for purchasing applications, it may make sense for the relationship [A is component of B] to be weighted less, whereas relation [A is special case of B] is to be weighted strongly, and precisely the opposite for parts lists. When selecting priority design components, the relationships [A is standard for B] or [A is material of B] can in turn have a very much greater significance.

Specific technical features (e.g. the standard) can optionally also be weighted more highly than the actual concept in order to thus reduce the effect of equivocal terms.

It is also possible that an entity-specific relationship is weighted more strongly, in order to thus introduce a very special perspective. (A is an add-on part for B)

3. It is possible to define the decline in the similarity measure for indirect relationships. Thus, although it is true that both a valve plate and also a valve have a certain semantic proximity to fluid technology, in the case of the valve plate, a smaller semantic proximity (the same applies to "trim resistor" and "electronics" and "passive component" and "electronics") may be established.

An aspect of the present embodiments is directed towards an input process within the framework of an analysis of data by a computer for the automated creation of a new, or modification of, a data structure for information technology objects. The objects represent technical components from the production sector and are assigned to an entity and stored in at least one database with the following method steps:

Providing an automatically generated selection menu with valid component identifiers on a user interface during an input of terms or partial terms for identifying the technical components. The component identifiers offered in the list are synchronized with the manually input terms or partial terms during the input;

Determining a component identifier by complete manual input or by confirming a valid component identifier offered in the selection menu;

Accessing at least one rules database or a stored assignment table, in each case in order to automatically assign to the specific component identifier through the computer a class for the creation or modification of the data structure. The assignment is made to entity-specific, semantic-technical relationships.

It should be pointed out that the first step (providing a selection menu) is not imperative and it is also possible for the user to input directly valid component identifiers.

With this aspect of the present embodiments, the input of the component identifiers is standardized in a company-specific way. The user is supported by being "allowed" to input only previously defined valid component identifiers. Otherwise the input is not valid. For example if, instead of "trim resistor" the user inputs only the incorrect and incomplete detail "trim res", the user is automatically offered the correct and complete detail "trim resistor" in the selection menu. After the user has confirmed the complete detail identifier with a mouse click, the complete identifier is used for the rest of the method. An assignment of the component identifier to the class or structure within the data structure to be generated or modified takes place automatically.

Data redundancies which can lead to serious errors can thus be avoided.

Furthermore, the thus-captured material master data which are now available for the production process are complete, standardized, consistent (duplicate-free) and can be interpreted uniformly. This may result in a clear improved data quality and reduced outlay on production and process costs.

Furthermore, there is a possibility that the user once again changes or corrects the terms or partial term input by the user before the completion of the input process.

The specific component identifier and/or the assigned class is stored and optionally forwarded directly to an ERP system (enterprise resource planning system).

Thus, the processes during master data administration can be significantly sped up, improved (error-free, duplicate-free) and simplified. Automatic classification based on a company-specific master data situation with a reproducible result is also possible.

The rules database is already available as structured after the initial classification.

The assignment rules can be flexibly adapted to the application. This is also still possible during operation or while input is ongoing. For example syntax rules, rules for valid ranges, rules for the assignment of a generic term to a class and/or rules for the standardized component identification can be defined here.

In the case of the system-supported input described above, it is not absolutely necessary to create technical relationships or to measure a distance between the objects. A clear assignment (standardized component identifier and class) is already possible on the basis of the standardized input.

According to an alternative embodiment, no training data are necessary for the generation of the data structure for the technical components. Nor is it necessary for there to already be a data structure which is re-structured according to new criteria. A complete redesign or recreation of the data structure is carried out according to techno-semantic rules. Not statistic or stochastic values, but company-specific technical, component-specific variables are taken into account for the creation of the data structure. If the system-supported input aid is to be used, the user inputs terms or partial terms or directly valid component identifiers so that, after determining the component identifier accessing the assignment rules, a class is assigned to each component identifier. The data structure is generated on the basis of this assignment.

Thus, the present embodiments provide that the user has only to input data for a technical component in one field. The system then completely automatically creates a data structure based on company-specific conditions or rules. The rules can also be established independently of a specific use of the terms for the components in the company. For example, it is possible that a distinction is to be made between different fixing device (e.g. screws and nails) in a production plant because of a new production line. Hitherto, however, no distinction was drawn between nails and screws in all texts and in practice. In the state of the art, which is based on purely statistical methods, this new distinction could not be reproduced. According to the present embodiments, new rules may be added to the rules database. The new rules reproduce the screws with a first component identifier and nails with a second component identifier. As soon as the user inputs the term "screw", it is automatically assigned to the first class, i.e. a different class to the term "nail". This may not be possible with methods which are based on a statistical analysis.

The creation of technical relationships between the parsed objects is computer-based and preferably completely automatic. Technical, company-specific expertise, which can change from one entity to the next and is generally differentiated, is modelled and taken into account.

According to a preferred embodiment, the entity- (or company) specific expertise is modelled in a preparation phase and used to create the data structure. The technical modelled expertise comprises information regarding the respective technical components and technical relationships, such as "is fitted in" or "is seal kit for."

The distance between the objects is preferably measured by creating a semantic network and the distances between the objects measured in the semantic network.

A further aspect of the present embodiments is directed towards creating the data structure from the technical metrics. In principle, any technical relationship between the objects or specific characteristics of their features can be reproduced in a data structure. A database inquiry is sufficient for the search for specific features and relationships. If, on the other hand, a new structuring or ordering criterion is to be constructed, then a cluster analysis can be carried out. The cluster analysis groups the information objects by semantic proximity (i.e. on the basis of the technical relationships) in conjunction with an entity-specific assessment on the basis of the adjacency matrix.

In principle, any cluster algorithm that can be carried out on the basis of an adjacency matrix can be used. A preferred embodiment is hierarchically agglomerative clustering with a pre-defined set of target clusters. An embodiment in which the clustering is carried out in several steps using different methods and gradually optimized by this is possible.

In a further embodiment, firstly there is a (rough) clustering on the basis of the descriptions. According to this, an optimization takes place with the help of further signifiers that are assigned to the object.

The data structure includes the assignment of an identifier (ID) of the information object to a cluster (generated in the course of the algorithm).

Components can be all technical components which are required and worked within the framework of a production or design process. These components are also called items below, in order to illustrate that this includes not only the components to be worked but also starting materials and basic elements, such as plates and wafers in chip production. Further examples of components and items are "valve", "valve fitting", "non-return valve", "valve disk", and "magnetic valve."

Examples of technical relationships are: "is part of", "is component of DIN standard . . . ", "is production method for", "is surface-treated with", and "is part of group . . . . "

In the above-mentioned examples, an example of technical metrics can be: "seal kit is part of valve" or "non-return valve is special form of valve." The technical metrics term thus defines in the mathematical sense a distance concept between the elements. The technical metrics depend greatly on the respective field of use in the company or in the entity in question. It is possible that every entity, thus in particular every part of the company, has its own rules for reproducing these relationships. In a preferred alternative embodiment, every entity has the same rules but its own evaluation criteria for the metrics. This is preferably implemented via parameters with which the relationships are weighted. Depending on the sector, there are however also rules which can be defined so as to cover more than one company and thus apply to several companies. Both types of rules are taken into account and modelled according to the solution. One rule could, for example, be devised for the term "valve" to capture only objects with technical relationships with "valve" which are relevant for fluid technology.

An aspect of the present embodiments is the provision of a possibility with which the technical items of a company and their relationships to one another can be reproduced using information technology. It is important that the technical conditions can be directly and completely incorporated into the information technology system and modelled.

An essential core idea is that the company-specific rules and conditions can also be reproduced using information technology. This means that the data structured according to the present embodiments are also (further) processed according to the company-specific rules and thus differently, depending on the structuring unit. Thus, it can be set up to format and/or process data in a first structuring unit of the captured data structure differently from data in a second structuring unit. For example, objects which are assigned to the structuring unit ". . . is surface-treated with . . . " in metal working, are further subclassified into "cured", "plasma-coated", or "ion beam-coated." In the different structuring units and/or subclasses, different methods of data processing (depending on the preceding semantic analysis) can then be used. Generally worded, the semantic relationships can be electronically reproduced and then specifically (further) processed, with the result that, for example, an electronic procurement system in the field of mechanical engineering for the item "valve" is incorporated into the technical metrics only relationships and objects which are relevant to the department in question, such as "non-return valve", "diaphragm safety valve", or "ball valve." The terms which, for example, can be assigned to the term "valve" according to usual vocabulary, such as "let off steam", "anger", or "to build up anger", are not taken into account.

The stochastically based methods frequently used in the state of the art which build on the complete language vocabulary are not used with the process proposed here. These methods are not entity-specific and therefore cannot model and reproduce the technical conditions in the company. On the contrary, the technical relationships are to be defined such that all entity-specific and decisive action mechanisms, processes and relationships in the company are covered.

In other words, the newly created data structure is an information technology-based modelling of the technical conditions in the company in question or in the company unit in question. Thus, there is an independent selection of the data relevant for the company and the items. Thus, the created semantic network is modelled, structured and represented in more detail only in the areas where the network is also relevant for the company. In other words, the consideration level is deepened only where necessary for company-specific reasons.

According to an embodiment, the method is fully automatic, with the result that no user interaction is necessary. Thus, errors which are attributable to an insufficient data acquisition can be avoided. In addition, the method can be carried out significantly more quickly. In particular, the following method steps are carried out automatically: the capturing of the objects to be structured, and the parsing and evaluation of the technical relationships on the basis of entity-specific rules and parameters. In an alternative embodiment, parts of the above-named method steps are carried out semi-automatically by requiring, in response to a user interaction, a confirmation of the automatically generated proposal only by a user. For example, this would be conceivable if new technical relationships and/or new objects are to be added to the data structure.

According to a further embodiment, classes of objects can be deduced automatically from the technical metrics. In other words, groups or classes of objects can be formed. As an example, the class of all valves may be named here. The class of objects of valves also includes, in addition to non-return valves, magnetic valves or ball valves. In addition, it is possible to generate a hierarchy of objects and/or a hierarchy of classes of objects. The hierarchy can be generated by different schemes. For example, an "is part of" hierarchy or a "belongs to" hierarchy can be provided. According to a preferred embodiment, the generated technical metrics can also be represented as a result on a user interface. This takes place usually in graphical form, such as in the manner of a directed graph. The classes of objects and hierarchies of objects and/or classes of objects as well as technical clusters can be highlighted. Highlighting can be by different colours on the graphic user interface or a different design (different type of lines: dotted/dashed).

The construction of the technical metrics can include a clustering. Main focuses for specific groups of objects can thus be formed. Different techniques can be used for the clustering. In addition to a semantic similarity analysis, statistical methods and a combination of the two can also be used. It is also possible to specify details of the clusters beforehand. Thus, for example, a minimum and a maximum number of clusters can be defined in order to be able to achieve a meaningful classification for the company in question.

The output is at least the technical metrics (e.g. in graphical representation). In more complex embodiments, more metadata and additional information can also be provided here as a result. The result, thus in particular the technical metrics, is filed in an electronic memory and can be accessed, such as via the Internet or another network. The objects to be structured can be stored together with the technical metrics in the same data memory. It is likewise possible to provide the objects to be structured, which basically serve as an input variable for the method according to the present embodiments, in a separate data record-keeping system. This is advisable for example for security-critical uses.

A graphical schematic representation of the created data structure can additionally be included as a result of the method according to the present embodiments. In other words, the objects to be structured which have been automatically classified into a data structure according to the present embodiments are shown schematically on a graphic user interface for easier use and navigation in the data structure for the user. By operating interactive switching elements on the user interface, the user can select specific elements from the data structure and access these directly.

According to an aspect of the present embodiments, the technical clusters can be calculated from the technical metrics. Calculation of the clusters takes place iteratively with gradual adaptation of the parameters.

According to a further aspect, the method includes a similarity analysis on the basis of the technical metrics. The similarity analysis is preferably semantic and based on the technical relationships between the items.

According to an aspect of the present embodiments, the technical metrics are generated such that duplicated objects are automatically identified and optionally also deleted immediately or prepared for deletion. In order to increase security at this location and in order to avoid consequential errors due to an erroneous deletion, a user confirmation, which is polled via a corresponding signal, may also be required.

It can thus be ensured that one and the same technical item is not represented more than once by information technology objects. Errors may be reduced with this feature.

According to an aspect of the present embodiments, a distance between the objects is calculated on the basis of the technical metrics. The distance is usually a semantic distance, which is intended to represent the distance between the items from a technical point of view. Thus, the graphical design of the technical metrics can be very quickly and simply grasped by a user.

When generating complex data structures with large databases, it is advantageously provided that a prioritization in respect of the objects is provided. In other words, firstly and for example at a highlighted location, the objects that are extremely relevant for the application in question in the company are represented. This is followed by the less relevant objects. The important items of information can thus be represented and processed more quickly and more easily. Usually, the distance and the prioritization depend on the application in question and the company in question. Thus, it becomes possible to define and provide different distances and different prioritizations as well as different technical metrics for different organizational units of the company.

Usually, the method according to the present embodiments includes interfaces, such as a user interface, via which a user can input entries in different formats. In particular, the user can input here the parameters for distance and/or the parameters for determining the number of clusters and/or for entity-specific rules. In addition, a graphic interface is also provided via which the result (generally in the form of a graph) can be represented. In addition, different interfaces to other systems are naturally also conceivable depending on the application.

According to an aspect of the present embodiments, the method includes a selection, with the result that only the relevant objects with their relationships are incorporated into the technical metrics. Predefinable criteria are used for the selection. This serves to ensure that the technical metrics need not be unnecessarily complex.

According to an aspect of the present embodiments, it is provided that the technical metrics can be dynamically expanded. In other words, the technical metrics are directly adapted as soon as there is a change in technical conditions. If, for example, a new project group with a new metal working is incorporated, the corresponding technical metrics are expanded to include the objects produced and the respective machine.

It is also possible to apply the method iteratively. In other words, several passes can be carried out to construct the technical metrics. The iteration has the following aims:

1. With regard to a used algorithm: to reduce the computing capacity required, it may be advisable to initially start higher up in the object hierarchy and only then proceed to a single material plane.
2. With regard to optimization: the user is thereby enabled to adapt the entity-specific parameters if appropriate.

The technical relationships are to reproduce the conditions and relationships of the objects in the company as optimally as possible. The following examples of relationships can be defined:
- has technical standard DIN . . . (e.g. "head cap screw has standard ISO 4762")
- is surface-treated with (e.g. "heat sink is etched blue")
- is test method for (e.g. "Shore is test method for hardness")
- has technical requirement for (e.g. "clamp must be adjustable")
- is manufacturing process for (e.g. "aluminium casting is manufacturing process for housing")
- is addition for carrying out for (e.g. "seal is performance add-on for earthing sleeve"—key word "with")
- has material composition of.

According to one aspect of the present embodiments, the method may also serve as control for processes in the sector (e.g., of production management, purchasing, stock-keeping, work preparation, maintenance and/or logistics). There is also an important use in the sector of development and design processes, wherein priority design components can be reproduced accordingly in the electronic model. The priority design components can be grouped together either to a cluster of their own or corresponding rules can be defined assigning a shorter semantic distance in each case to the priority design components.

The present embodiments also relate to the use of the above-described method for the control of access to objects. It can likewise be used to store the objects in a store or in a database. Another possibility for use is the fact that a data structure has already been created and the data classified in the existing data structure are however to be restructured. A correction or amendment of an existing data structure is also to be carried out. This is achieved by the reading-out and capturing of objects from the old data structure and then subjecting them to a parsing. Technical relationships between the parsed objects are then recalculated or evaluated to construct new technical metrics, wherein the technical relationships are based on company-specific rules for the technical items. In one embodiment, technical relationships (e.g. basic) already exist in the technical metrics to be created, which can also be used as a semantic lexicon. At a later point in time, there can be an evaluation/metrics of these relationships, based on the entity-specific conditions.

A further solution according to the present embodiments is to be seen in the system for analyzing data for the purpose of creating a new data structure. In addition to a database, the system includes an interface for presentation of the technical metrics.

According to a preferred embodiment, the system also includes an acquisition unit which is designed to capture the objects to be structured via an interface. In addition, a parser is provided to analyze the captured objects. Additionally, a structuring unit is also included. The structuring unit is intended to structure and classify the data into a structure taking the technical metrics into account.

BRIEF DESCRIPTION OF THE FIGURES

In the following detailed description of the Figures, embodiment examples are explained with reference to the Figures with their advantages, alternative embodiments and features, in more detail.

There are shown in.

DETAILED DESCRIPTION OF THE FIGURES

A main field of use of the present embodiments concerns master data administration in the field of mechanical engineering. The core problem is to be seen in the fact that, for example, all technical items for producing a gear mechanism, such as shafts, nuts, screws, and bolts, have to be transferred into an electronics system in order to be further processed. It thus becomes possible to create electronic parts lists for procurement or logistics operations. Other uses are naturally also possible here, such as materials testing for the capturing and measuring of material properties of the technical items.

Figure 1:
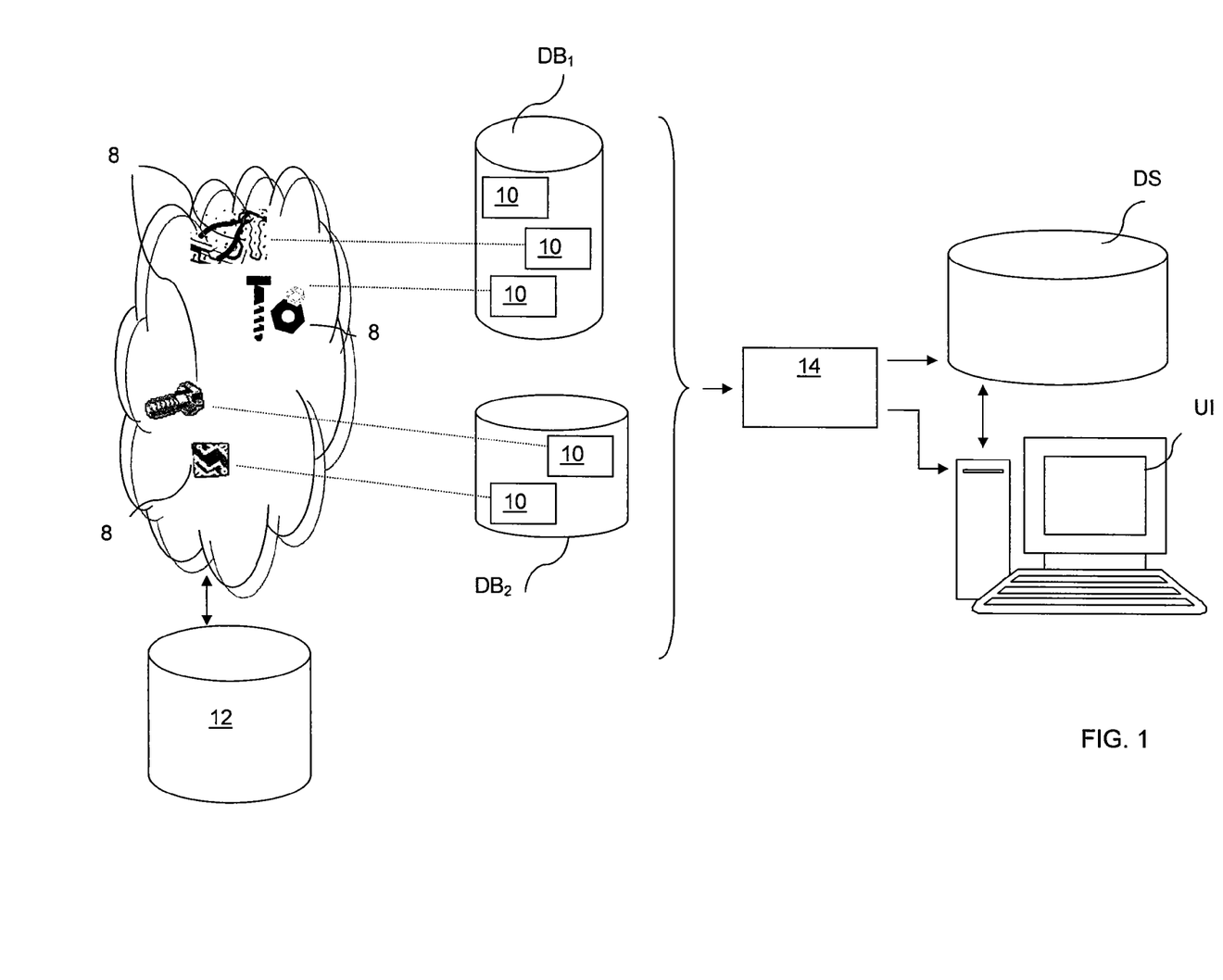
FIG. 1 a schematic diagram of elements of the system according to a preferred embodiment and FIG. 2 a flow chart of method steps according to a preferred embodiment.

The ordering of the production site (thus of the company or of the plant) is of importance for the construction of an electronic data structure DS. In this application, the company is therefore grouped under the generic term entity E. A company that specializes in the manufacture of gear mechanisms usually has different taxonomies and different technical items 8 from, for example, a company which operates in the field of fluid technology and produces valves.

The new data structure DS to be created is entity-specific and can be directed specifically towards the conditions of the company or of the technical field. For this, the system accesses a rules database 12 which is closely linked to the technical objects 10 and has an interface to a structuring unit 14, which is part of the system.

The actual technical components or items 8 (e.g. valves, bolts, and nuts) have to be modelled in the electronic system, with the result that the items 8 are represented via objects 10 assigned to each of them. This is preferably a bijective 1:1 assignment, with the result that just one technical item 8 is assigned to just one technical object 10.

The technical objects 10 can be stored in one database DB or in several, different databases $DB_1$, $DB_2$, $DB_n$.

The technical objects 10 are then captured by a capturing unit and forwarded to the structuring unit 14 together with rules, which are filed in the rules database 12.

The structuring unit 14 serves to classify, file or group the objects 10 to be structured in the data structure DS to be created. According to an alternative embodiment, the structuring unit 14 can such that the data structure to be generated is already "prefilled" (e.g. with basic relationships and objects). In principle, the relationships do not, however, change with the entity E, but only the parameters according to which the rules are evaluated or modified.

According to a preferred embodiment, the created data structure DS is additionally schematically represented on a user interface UI on a user's computer. Thus, the user can very quickly and easily obtain an overview of the created data structure DS and recognize the essential relationships between the technical objects 10.

According to a further preferred embodiment navigation is provided with which a user can navigate the user interface UI in the schematically represented data structure DS. In other words, a user can select an element of the schematically represented data structure through a corresponding user input (e.g. mouse click, or keyboard operation). If the navigation module has been activated, a window on the user interface UI can thereupon open, via which the user is asked whether the selected element in the data structure DS is to be automatically accessed. Following a corresponding input by the user, the user can answer this question and respectively confirm or deny access. After a confirmation input by the user, the data structure DS is automatically accessed in order to access the selected element.

In more complex embodiments, useful metadata is displayed on the user interface UI. The metadata relate, for example, to related objects 10, which are semantically close to the selected object 10. It is also possible to represent the higher-order selected group of objects 10.

A typical sequence of the method according to a preferred embodiment is illustrated below in connection with FIG. 2.

In a first step 1 the objects 10 are usually read in from different data sources $DB_i$ via an interface. The reading-in is completely automatic and can be configured according to specific predefinable parameters. Thus, it is, for example, possible to already make a selection here and read in only specific objects 10 while other objects are not to be captured. It could also be set up, for example, to read in only the objects 10 from a specific data source DB and take no account of all other objects from other data sources DB. Communications connections between the database DB and the structuring unit 14 of the system are provided for this. This may involve the Internet or other networks, such as for example client-server architectures.

In an advantageous embodiment, the objects 10 are not read in directly from the data sources DB, but indirectly via parallel systems, such as from enterprise resource planning (ERP) systems.

In more complex embodiments, the acquisition of the data or of the technical objects 10 is carried out completely automatically to control access to different databases. Technical documents, data sheets and other material can be accessed via internal networks (intranet) as well as via external networks via an interface. The degree of automation of the method can thus be increased again. In addition, the risk of error can also be reduced by carrying out an automatic data acquisition. Hit is ensured that company-specific processes and conditions are adequately represented.

The data can alternatively be acquired semi-automatically. Thus, in an advantageous variant of the present embodiments, an automated system-supported capture or input of terms is provided. The user inputs at least a part of the term in text form for the respective object via a mask provided on a user interface. The system then searches provided so-called templates (electronically stored valid terms) for possible terms. The possible terms are the same as the input (part-) terms or display a high degree of similarity. The selection of possible terms is offered to the user in an automatically opening window on the user interface. The user's input of the term is automatically synchronized with the sought terms offered for selection and takes place in real time. Depending on how many characters the user has already input manually, the list with the terms offered for selection is smaller. The more incomplete the manually input search term is, the longer is the automatically generated selection menu. If, for example, the user inputs "semi-finished pi," then the system automatically recognizes the error ("a" instead of "i") and corrects this to "semi-finished part" and searches the templates for suitable supplements or completions. Thus, among other things, the user is offered for selection "flat Alu 500×50×10 EN-AW6660." If the user confirms this term by a mouse click on the corresponding input in the selection menu, this is used for the input and for the rest of the process. If no suitable valid term can be found, an error message is automatically sent to the user.

In a further embodiment, a syntax check is automatically carried out. The syntax check reproduces the terms on a term structure standardized beforehand. These include, among others, a standardized style and/or a standardized sequence of elements for identifying the object.

The terms offered within the framework of the system-supported input are company-specific. The term "entity" relates, according to an aspect of the present embodiments, to an organizational unit, a company or a part of a company or to a group of companies.

If a term has been determined, the term can be used as a basis to automatically determine a class for the object assigned to the term. This is preferably carried out via the access to stored assignment instructions. An assignment instruction covers the assignment of term and a class in the data structure to be created or modified.

The system-supported input is not only an editing aid, but an intelligent automated object-identification process, which can include an error correction, an automatic completion and/or an automatic generic term formation. The object identification process is specially designed for the semantic classification of the technical components (objects).

After the reading in of the data, the read-in data are pre-processed in step 2. An identification key for the respective data objects 10 is created and the data objects 10 are stored in improved format. For example, write errors are identified and corrected here. It is likewise possible to automatically complete incomplete object identifiers.

In a next step 3, a parsing of the read-in objects 10 takes place. After this step, an identification key and an n-triple are thus ready for each object 10. According to a preferred embodiment, the n-triple comprises the following details concerning entity, position and class of the object 10.

By parsing the read-in objects 10, the technical precondition for the following further method steps is created:
Identifying the structuring-relevant objects 10,
Feature extracting, and
Eliminating fillers and irrelevant objects 10 or elements.

Parsing takes place using various techniques and includes in particular a lexical parsing, a pattern recognition and access to local, entity-specific syntaxes. In a more complex embodiment, an optimization of the parsing can also be provided, by analyzing master data of company E and identifying typical patterns, nomenclatures or other phrases.

In this method step (parsing), the objects 10 are thus identified as signifiers in a string representing the information object (generally present in text format) and used for structuring and classification. It is possible that equivalent signifiers are combined to form groups of synonyms.

In a following method step 4, an evaluation and selection algorithm is applied. The selection algorithm takes place on the basis of the technical standard. Thus, the technical conditions, in particular including company-specific conditions, form part of the selection algorithm. In other words, company-specific standards, presets and rules can be applied here.

The technical metrics are generated in a consequential method step 5. The technical metrics are a semantic network which includes distance relationships between the objects in relation to their technical connections. The creation of the semantic network or technical metrics takes place iteratively in several passes. Once new objects 10, new rules, or new circumstances are introduced into the system, a new pass can be initiated to create the technical metrics. Preferably, this takes place automatically. The objects are also linked to one another as signifiers with their technical relationships by this step. The technical metrics thus reproduce relationships existing universally between the technical objects 10. A substantial proportion of the relationships goes beyond a mere semantic relationship and explicitly takes account of technical and scientific circumstances of the entity E, the degree and weighting of which in particular are company-specific.

Once the technical metrics have been generated in the form of the semantic, technical network, it is possible in a more complex embodiment to have the result displayed schematically on a user interface UI, in order that the user obtains an overview of the generated data structure DS.

In a method step 6, a clustering takes place within the technical metrics. A pre-definable number of objects 10 is combined to form disjunctive clusters. Further parameters for clustering can be read in via a user interface. The parameters include, for example, the semantic distance and the number of clusters as well as a number of maximum objects 10 assigned to a cluster. Further parameters can also be defined here. It is likewise possible that the parameters from other systems are read in via a further interface. An additional grouping of objects is thus achieved with the clustering within the created data structure DS. Specific threshold values may be defined for the clusters formed from the semantic network or from the technical metrics. Objects 10 that lie outside the threshold value can be assigned by allocating the object 10 to the cluster to the centre of which it is at the shortest semantic distance or has the greatest semantic similarity. Entity-specific rules from the rules database 12 are taken into account.

Figure 2:
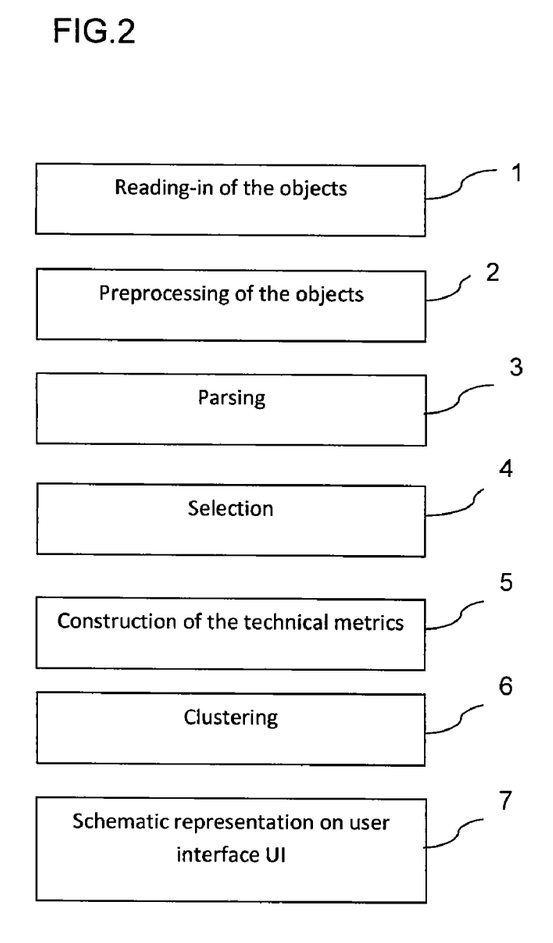

The technical metrics are schematically represented on a graphic user interface UI (as already mentioned above) in the method step 7 represented as the last step in FIG. 2. In a preferred embodiment, it is also possible here to provide navigation with which the user has the possibility of navigating in the generated data structure DS in order to identify specific objects 10 or sub-objects and to access same.

The method is basically independent of the language used in each case for the objects 10. As the data structure DS is regenerated in each case it can also be generated for other languages. Alternatively, it is possible to transfer a once-generated data structure DS into other languages by a translation process. Usually, it is provided that the language used in each case for the object 10 is also documented. This can appear, for example, as an entry in a small window on the screen interface UI, which is activated in response to a mouse click.

According to a preferred embodiment, the created data structure DS conforms to standards, in particular according to a preconfigurable DIN standard. Alternatively, other standards and presets which reproduce company- or sector-specific knowledge can also be taken into account here.

In another embodiment, the system and method are implemented as a distributed system and can be applied on different computer-assisted workstations, which exchange data with one another. In addition, it is possible to provide different forms for data input, such as a speech input or an input in text form. In addition, it is possible to provide a data conversion in order to convert different data formats into a single data format, which can then be further processed.

As already mentioned above, one embodiment is directed towards creating a new data structure from an unstructured quantity of complex technical individual components (e.g. from parts lists for electronic components or for products in the field of mechanical engineering) from new. An alternative embodiment variant provides that no new data structure DS is created but that an already existing data structure DS is modified such that the data structure reproduces the technical conditions as adequately as possible. Thus, an already existing data structure DS is transformed into an optimized, better-adapted data structure DS'. The objects 10 structured in the data structure DS are reclassified again using the method, wherein the assignment takes place using the technical metrics or on the basis of the semantic distance from the centres of all existing classes and by assignment into the class with the shortest distance.

In a further embodiment, the integration of the user is provided. The user can then execute corresponding inputs in order to initiate an amended control of the data structure creation process. For this, the data structure DS created according to the method is diagrammatically represented (e.g., as schematic diagram) on the user interface UI. Clusters can also be represented here (e.g., by highlighted representation). If, when the cluster is represented on the user interface UI, the user is of the opinion that this cluster is complete and no further objects 10 are to be added to it, the user can declare this cluster "finished" by a corresponding user input and thus block it. Accordingly, in the further course of the method, no further objects 10 can be assigned to this cluster. In the course of a further use of the method or upon further iteration by the method, new objects 10 are added only to the "unfinished" clusters. A neuronal network can be used for cluster analysis.

As a further optimization criterion, the method can also access a stochastic module, which is intended to count incidence frequencies of objects 10 and evaluate these using statistical methods, for the purpose of constructing the technical metrics. The method according to the present embodiments is in principle not based on the use of a statistical method. The use of statistical data is only optional and represents an advantage inasmuch as the technical metrics can thus be generated more quickly and more efficiently.

In order to highlight once again, at this point, the difference from the state of the art, it may be described here how a classification of objects into an already-existing data structure is carried out using methods from the state of the art. A class structure is already predetermined. The elements to be structured are then analyzed for specific features. A fixed set of rules is then used, such as, say: "if feature x->then classify in class y." The assignment into a class, the classification, is thus feature-driven in the state of the art. In contrast to this, the present embodiments re not based on a feature-based classification. According to the present application, the object 10 itself is analyzed and the relationships between the objects 10 are used to generate semantic relationships between the objects 10. Additional features can also optionally be used. According to the present embodiments, each new class structure is thus created from the objects 10 and the relationships between the objects 10 to one another, as well as also between the relationships between the objects 10 and higher-order object groups. To assign an object 10 into a data structure class, the semantic distance between the object 10 to be ordered and the other objects 10 in the same data structure class is measured. If the measured semantic distance is less than a predefinable threshold, the object 10 is ordered into this data structure class, otherwise the method is repeated in order to find a more suitable data structure class.

Because of the dynamic classification, it is possible to have the data structure DS take account of specific, technical conditions and achieve an adaptation with regard to same.

According to a preferred embodiment, the technical relationships between the objects 10 can be in particular structural relationships and/or functional relationships. Examples of structural relationships are: "A is component of B", "A is accessory for B". Examples of functional relationships are: "A performs function B", "A is test method for component B". Preferably, however, further relationships are also represented, such as:
  "A is made from material B",
  "A is surface-treated with B",
  "A is production method for B",
  "A is standard for B",
  "A is DIN standard or other standard for B"
  "A is requirement for B",
  "A is physical unit for B",
  "A is chemical formula for B",
  "A is type designation for B",
  "A is manufacturer of B", etc.

The method or the system according to the present embodiments exchanges data with other systems, such as with ERP systems and PDM systems.

The invention claimed is:

1. A method of analyzing data by a computer for the automated creation of a new data structure for information technology objects, wherein the objects represent technical components from the production sector and are assigned to an entity and are stored in at least one database, the method comprising:
  capturing, via an interface, the objects to be structured;
  parsing the captured objects;
  creating technical relationships between the parsed objects;
  measuring a distance between the objects based on the created technical relationships, the distance serving as a technical metric for creating or modifying a data structure; and
  automatically generating a graphical schematic representation of the new data structure based on the technical metric.

2. The method according to claim 1, wherein the capturing, parsing and measuring are carried out automatically.

3. The method according to claim 1, wherein object classes are derived automatically from the technical metric, a hierarchy of objects, object classes, or combinations thereof.

4. The method according to claim 1, Wherein the technical metric is stored in an electronic memory.

5. The method according to claim 1, wherein technical clusters are calculated iteratively with gradual adaptation of parameters from the technical metric.

6. The method according to claim 1, wherein a similarity analysis is performed based on the technical metric.

7. The method according to claim 1, further comprising automatically identifying object duplicates.

8. The method according to claim 1, wherein a distance between all or selected objects based on the technical metric is measured.

9. The method according to claim 1, wherein the objects are prioritized in respect of their importance in relation to the technical metric for the entity, and a distance, a prioritization, or combinations thereof are entity-specific.

10. The method according to claim 1, wherein a user interface is provided via which a user makes inputs in text or speech of parameters for a distance, for a number of clusters, for entity-specific rules, or combinations thereof.

11. The method according to claim 1, further comprising selecting specific objects for the construction of the technical metric according to predefinable criteria.

12. The method according to claim t, wherein the technical metric is dynamically expanded.

13. The method according to claim 1, wherein a user interface is provided for representing the technical metric, wherein the technical metric is displayed graphically in the form of a directed graph.

14. The method according to claim 1, wherein capturing, parsing, measuring and creating are performed iteratively.

15. The method according to claim 1, wherein the technical relationships are based on a technical norm or a technical standard.

16. An input method within a framework of a data analysis by a computer for automated creation of a new, or modification of, a data structure for information technology objects, wherein objects represent technical components from a production sector and are assigned to an entity and stored in at least one database, the method comprising:
  providing an automatically generated selection menu with valid component identifiers on a user interface during manual input of terms or part-terms for identification of the technical components, wherein the component identifiers offered in a list are dynamically synchronized with the manually input terms or part-terms;
  determining a first component identifier by complete manual input or by confirming as one of the valid component identifiers offered in the selection menu;
  accessing at least one rules database, in order to automatically assign a class for the creation or modification of the data structure to the first component identifier, wherein assignment is to entity-specific, semantic-technical relationships.

17. The method according to claim 1, further comprising controlling access to Objects, storing objects in a memory or in a database, or combinations thereof.

18. The method according to claim 1, further comprising correcting, amending, or combinations thereof errors from a database of the objects in an existing classification structure.

19. The method according to claim 1, wherein the technical metric is based on entity-specific rules for the technical components.

20. A system for analyzing data, the system comprising:
a computer for automatically creating a new data structure for information technology objects, which represent technical components from the production sector, wherein the objects are assigned to an entity and wherein the computer is configured as:
a structuring unit to classify the objects and create the new data structure in the form of technical metric; and
a measuring unit for measuring a distance between the objects;
a database in which the objects to be structured are filed;
an interface for representing the technical metric with the measured distance; and
a display for presenting a graphical representation of the new data structure based on the technical metric.

21. In a non-transitory computer readable medium having stored thereon a computer program, implemented by a processor, the computer program comprising instructions to:
automatically create a new data structure for information technology objects, wherein the objects represent technical components from the production sector and are assigned to an entity and are stored in at least one database, by:
capturing, via an interface, the objects to be structured;
parsing the captured objects;
creating technical relationships between the parsed objects; and
measuring a distance between the objects based on the created technical relationships, the distance serving as a technical metric for creating or modifying a data structure; and
automatically generating a graphical schematic representation of the new data structure based on the technical metric.

* * * * *